(12) United States Patent
Gilbert

(10) Patent No.: US 7,977,825 B2
(45) Date of Patent: Jul. 12, 2011

(54) ENERGY SAVER

(75) Inventor: Jerome Gilbert, Levallois-Perret (FR)

(73) Assignee: Ergylink, Levallois-Perret (FR)

( * ) Notice: Subject to any disclaimer, the term of this patent is extended or adjusted under 35 U.S.C. 154(b) by 803 days.

(21) Appl. No.: 11/766,848

(22) Filed: Jun. 22, 2007

(65) Prior Publication Data

US 2007/0297112 A1    Dec. 27, 2007

(30) Foreign Application Priority Data

Jun. 23, 2006    (FR) ...................................... 06 05627

(51) Int. Cl.
    *H02B 1/24* (2006.01)
(52) U.S. Cl. .......................................... 307/131; 307/38
(58) Field of Classification Search .................. 340/656; 307/126, 131, 38, 31
    See application file for complete search history.

(56) References Cited

U.S. PATENT DOCUMENTS

| | | | |
|---|---|---|---|
| 6,476,523 B1 * | 11/2002 | Lee | 307/141 |
| 6,476,729 B1 | 11/2002 | Liu | |
| 6,636,026 B1 * | 10/2003 | Nomoto | 323/318 |
| 6,870,463 B2 * | 3/2005 | Dresti et al. | 340/10.4 |
| 6,940,272 B2 * | 9/2005 | Niv | 307/31 |
| 2005/0007712 A1 | 1/2005 | Shim | |
| 2007/0038334 A1 * | 2/2007 | Chou et al. | 700/292 |

FOREIGN PATENT DOCUMENTS

| | | |
|---|---|---|
| DE | 94 10 498 U1 | 9/1994 |
| DE | 203 19 827 U1 | 5/2005 |
| EP | 0 967 695 A | 12/1999 |

* cited by examiner

*Primary Examiner* — Jared Fureman
*Assistant Examiner* — Daniel Cavallari
(74) *Attorney, Agent, or Firm* — Young & Thompson

(57) ABSTRACT

A universal device for saving the standby power consumption of a functional group of appliances that can be constituted equally well by a set of items of computer equipment or a set of items of audiovisual equipment. The device includes at least one control device for switching on the functional group that is exclusively dedicated to the device, parts for connection to the electricity network and parts for connection to at least one main controlled appliance.

26 Claims, 5 Drawing Sheets

US 7,977,825 B2

ENERGY SAVER

TECHNICAL FIELD

The present invention relates to devices for saving energy. More particularly, the invention relates to an almost-universal adapter device for saving electrical energy when computer equipment or audiovisual equipment is in standby mode, and the invention also relates to combining the adapter device with additional functions.

BACKGROUND OF THE INVENTION

Although standby power killers (surge protectors, power strips, UPSs) are available on the market, those devices present numerous drawbacks, and in particular some of them risk damaging appliances connected thereto. There are two main categories of standby power killer, those that operate in master-slave mode and those that are specialized for a given type of application. The second category includes standby power killers for audiovisual equipment that make use of the signals emitted by the remote controls of such equipment, as described for example in Sony's patent JP 2001/268654.

State of the art master-slave standby power killers, e.g. as described in the patent application published under the No. US 2005/0007712 or in U.S. Pat. No. 6,940,272, generally include a relay for switching so-called "slave" loads, with switching being controlled by the current that is consumed by the so-called "master" load that always remains connected to the electricity network. Above the consumption threshold for the master load, which may optionally be adjustable by the user, the relay is closed, and below the threshold the relay opens. A priori, that type of device could serve equally well in a microcomputer environment and in a TV environment, however in practice it is found that state of the art standby power killers do not operate well with certain models of computer and/or TV set. State of the art standby power killers can even turn out to be dangerous for the connected appliances under certain conditions of operation in that they can embark on endless cycles of switching on and switching off that can lead to the destruction of the connected appliances.

In prior art devices, the following drawbacks are generally observed:

the standby power killer is specialized as a function of the type of equipment to which it is to be connected;

the trigger thresholds and the timeout periods depend to some extent on the waveform of the current flowing through the master load;

the accuracy of the switching thresholds and of the timeout period is not sufficient;

hysteresis is insufficient and can lead to ill-controlled switching;

it is not possible to correct for functional anomalies such as infinite loops of switching on and off as can be observed, for example, with certain DVB-T adapters and certain TV sets for which changeovers from the on state to the standby state and vice versa are controlled on the basis of the state of a signal coming from the TV set;

with master-slave models, a master load remains powered continuously, thereby reducing the savings that can be achieved, shortening the lifetime of the appliance, and reducing safety by increasing the risk of fire;

the standby power killer has its own active energy consumption that is not negligible, thereby reducing the saving achieved by using the standby power killer and lengthening the time required for the client to achieve a return on investment; and standby power killers are found to be fragile in the face of power peaks that might be absorbed by the controlled appliances at the moment they are supplied.

Prior art standby power killers specialized for TV sets and making use of remote control signals by decoding their meaning in order to detect orders to switch on or to switch to standby, present the major drawback of not being compatible with all TV sets. This drawback can be mitigated in part using devices that require prior training with the remote control codes, but it is nevertheless difficult to be compatible with all standards since they also present differences in physical terms, e.g. in terms of the frequency on which the modulation is carried and/or of the infrared wavelength. In addition, that training operation complicates considerably the use of a product that needs to remain simple if it is to be in general use with consumers.

Simplified models of TV standby power killers do no more than detect the presence of a modulated infrared signal and present several drawbacks including numerous false starts by detecting untimely signals that can sometimes involve a sudden change in lighting level being understood as a switch-on signal, in particular when the light sources are of the low consumption type since such sources have the feature of emitting over a broad spectrum.

In addition, the specialization of standby power killers in the state of the art as a function of the type of functional group that is to be connected thereto multiplies the number of different models that need to be manufactured, stored, and sold, which is inefficient, economically speaking.

SUMMARY OF THE INVENTION

The object of the present invention is to remedy those problems at least in part by proposing a standby power killer device that is substantially universal, being arranged to have the potential of operating with most types of functional group of controlled appliances, at least with certain computers and with certain TV sets together with their respective peripherals, and that stops supplying power to the main appliance of the functional group in the same manner as to any secondary appliances.

The device of the invention also makes it possible to prolong the lifetime of connected appliances and to reduce the risk of fire by disconnecting appliances that are not in use from the electricity network. The fact that unused appliances are disconnected from the electricity network reduces their exposure to high energy disturbances that might damage them. The operation of the device also leads to a reduction in the stress suffered by the power components of at least the main appliance by switching them on after initially putting the appliance into operation in standby mode.

The term "functional group of appliances" is used to mean a plurality of appliances capable of operating together to provide an expected service, although a functional group may comprise a single appliance. A functional group of appliances in the meaning of the invention further comprises a so-called "main" appliance together with associated secondary appliances. As noted, a functional group comprising no more than said main appliance is included within the invention.

A first example of a functional group is a microcomputer together with its peripherals. In this example, the main appliance is the central unit, and the associated secondary appliances may be a screen, amplified loudspeakers, a printer, a scanner, a modem, etc. Another example of a functional group is an audiovisual system having as its main appliance, for example, a TV set, a video projector, or any other display devices, and possibly including as associated secondary appliances: a DVD player, a set-top box, a terrestrial digital TV receiver, a satellite TV receiver, a home cinema amplifier, etc.

The term means is used broadly and includes circuitry, parts, elements, and other appropriate components to achieve the disclosed/recited structure and/or function in either a hardware solution or a software programmatic solution (e.g., a piece of software inside a microcontroller), or a hardware/programmatic mixed solution. Additionally, hardware is used herein broadly to mean analog and/or digital electronics-based solutions, mechanical solutions or a mix of these categories.

The invention is not limited to the field of computers and TV sets, a Hi-fi system or any other appliance or group of appliances that may save energy by implementing the invention is de facto in its scope.

Naturally, it would not go beyond the ambit of the invention if some other appliance of the functional group were to be selected as the main appliance. Similarly, it is possible to connect a plurality of appliances in parallel to an outlet intended for the main appliance if it is desired to configure particular functional combinations. For example it might be appropriate to connect in parallel, as a "composite main appliance", both a TV set and a digital video recorder (DVR). That arrangement enables the device of the invention to power the entire functional group so long as at least one or the other of those two is not in standby mode. This is advantageous, for example, with a DVR having a hard disk that must not be disconnected from the mains (power lines) without carrying out a specific shutdown procedure. In this example, the TV set can be switched off initially without worrying about the DVR, and it is only once the DVR has itself come to a complete stop, as detected by the standby power killer, that the power supply to the entire functional group is switched off.

The device of the invention comprises measurement means for giving an information representative of the power consumed by said functional group of controlled appliances, by comparing said information with a substantially predetermined threshold, power switch means for supplying or not supplying power to the functional group of controlled appliances, means for supplying the internal parts of the device of the invention, means for connecting the device of the invention to the electricity network, and other connection means for supplying at least one main controlled appliance.

In another aspect of the invention, the standby power killer device is characterized in that it includes means for enabling the user to command the supply of power to said functional group of controlled appliances with at least one of these means being dedicated exclusively to the device of the invention, means for maintaining the supplied state of said functional group of controlled appliances unconditionally for a substantially predetermined time, and decision-taking means for maintaining the supplied state of said functional group of controlled appliances so long as the power consumed is greater than a substantially predetermined threshold and for automatically stopping power supply to said functional group of controlled appliances when the power consumed is less than a substantially predetermined threshold for a substantially predetermined time.

The substantially predetermined times for the initial confirmation of the supplied state and for automatically stopping power supply after confirmation of the supplied state can be substantially the same for convenience of design, or it can be different, without going beyond the ambit of the invention.

The decision-taking thresholds for maintaining the controlled appliances supplied and for stopping their power supply may be the same or they may be different, depending on the implementation, without thereby going beyond the ambit of the invention. To simplify the description below of examples, by default, the selected option is to take decisions depending on whether consumption is above or below a single threshold.

At least one of the means for enabling the user to command the supply of said functional group of controlled appliances is exclusively dedicated to the device of the invention. The command means exclusively dedicated to the device of the invention may be constituted, for example, by a pushbutton on the device itself. The pushbutton may advantageously be remote, or associated with a second command means that is itself remote, and that is connected to the device by cable or by a specific wireless connection, e.g. a radio or an infrared connection, in order to make it easier to use. Other command means specific to the device of the invention can be implemented, such as, for example, a detector of sound signals that responds to perceiving a determined number of characteristic signals such as a whistle or a hand clap, or indeed voice recognition means, possibly simplified to such an extent as to recognize only one word.

In addition to at least one command means exclusively dedicated to the device of the invention, it can be advantageous to have one or more other command means shared with other items of equipment. A typical example of shared command means is an infrared signal receiver suitable for making use of the signals emitted by the remote controls for standard audiovisual equipment. Amongst the possible remote controls for audiovisual equipment, the remote control for the TV set connected to the device as the main appliance provides the additional advantage of enabling the user to perform substantially the same actions when commanding the supply of power to the functional group of controlled appliances connected to the device of the invention and when commanding the main appliance to switch from the standby state to the on state in order to keep the functional group supplied. Without going beyond the ambit of the invention, it is possible to make use of the meanings of the orders issued by the remote controls, either during manufacture by recording in a memory the main codes that need to be interpreted as a command to switch on, or else by the user performing prior training using the code that is transmitted by the remote control in question. Nevertheless, it is advantageous to make use of the infrared signal without decoding its meaning so as to make the device of the invention independent of standards concerning how transmitted information is encoded. Using a microcontroller makes it possible to distinguish effectively between a useful infrared signal and all other interfering signals such as those emitted by fluorescent light sources or by solar radiation. Nevertheless, a satisfactory device of the invention can also be implemented by using simple analog means. Thus, good results can be obtained with a simple analog electronic filter at the outlet from an integrated infrared receiver that is associated with a suitable mechanical mount for the detector in order to increase its directivity and enable an optical filter to be placed in front of the sensor. Means are advantageously added to adapt the selectivity with which remote control signals are received and/or to inhibit their effect on the operation of the device. For example adding an infrared signal receiver in the device is an advantage in a context of use with audiovisual equipment for remotely commanding the supply of the functional group. This same facility for commanding the device could become a liability in the context of use with computer equipment. Untimely commands could be triggered by receiving signals emitted by peripherals or computers, e.g. those fitted with IrDA ports. All or some of the remote control commands of the device of the invention can be inhibited by relying on electrical solutions such as a switch for short-circuiting the signal from the sensor or for inhibiting use being made thereof, or by programming in a digital embodiment, or indeed by mechanical techniques involving masking the sensor. Advantageously, the invention also provides for implementing a plurality of selectivity levels to adapt the level at which the remote on command is effectively taken into account as a function of signals associated with one or more given standards and/or in order to exclude or diminish the influence of signals deemed to be undesirable because they might trigger unwanted commands.

In an advantageous embodiment, it is possible to improve the filtering of unwanted incoming infrared signals in order to command more securely the supply of the group of appliances with a remote control while keeping the simple principle of infrared carrier detection without having to decode the command. This can be achieved through a sequence of known remote actions within a known time frame in order to supply power to the group of appliances. For example, a first key press on any key of any remote control followed by a substantially predetermined idle period and a new key press within a substantially predetermined time window. Advantageously, the user can be helped in executing such a sequence interactively by at least one visual indication, for example, by a light indicating when the time window opens for the next expected action.

In a particularly advantageous embodiment, it is possible to improve the universality of the standby power killer relative to the powers consumed by the connected appliances. This is particularly useful when the total power consumption of the secondary appliances plus the standby consumption of the main appliance is greater than or equal to the power threshold beneath which power consumption must drop in order to decide to switch it off. The proposed solution consists in measuring the power consumed by the main appliance only, taking no account of that consumed by the secondary appliances. This embodiment of the invention relies on an internal wiring solution that combines the advantage of common power switching for all of the appliances of the functional group, with the advantages of separate measurements concerning said main appliance. In this version of the invention it is necessary also to provide specific connector means that are identified as such for use with the main appliance.

In another aspect of the invention, the embedded measurement means comprise means for integrating or averaging the measured signal over a duration that is sufficient to make the device relatively insensitive to the waveform of the current flowing in the controlled load involved in the measurement. The controlled load may be constituted by a plurality of appliances or by the main appliance alone within said plurality. There is a very wide diversity of waveform characteristics for the current generated by the power supplies to be found in appliances of the kind that might be connected to a device of the invention. Certain switching based power supplies generate current peaks of short duration but great amplitude that disturb prior art standby power killers in that they are detected as apparent power well above the mean power genuinely consumed by the appliance. In an analog embodiment, this problem can advantageously be solved by one or more integrator cells, such as RC networks or operational amplifier integrators, for example. In a digital embodiment, the measurement should be averaged over a length of time that is long enough to represent the mean power, either synchronously or asynchronously relative to the frequency of the current. Given the relatively long reaction times that are desired for proper operation of the device, it is simplest to average the signal asynchronously over a length of time that is much longer than one cycle of the alternating current (AC), e.g. over 10 seconds (s) or for a given sampling number, such that a few halfwaves extra or fewer will not change the average result significantly.

State of the art standby power killers, in particular those dedicated to TV sets, include a power supply using a voltage-lowering transformer for powering their internal parts. Not only is a transformer more expensive and bulkier than a capacitor, but it also presents non-negligible consumption of active power, which power is metered by the user's electricity meter, thus going against the looked-for savings. Furthermore, transformers of very low power are wound with wire in the primary that is so fine that it becomes a component of poor reliability that is likely to break down at the slightest surge. The device of the invention advantageously includes a capacitive power supply having at least one capacitor as a series component used for dropping the voltage of the electricity network.

In another aspect of the invention, an additional timeout period of long duration can advantageously be added for keeping the controlled appliances supplied after detecting switch-off conditions based on the level of the power consumed by said functional group of controlled appliances or by the main appliance within said group passing below these thresholds for deciding to switch off, and before finally switching off the power supply to the connected controlled appliances. The long duration additional timeout period of the invention is reseted and activated on the appearance of switch-off conditions and is automatically deactivated or inhibited when the power consumption is above the threshold for deciding to switch off. This timeout period can be particularly useful when the device of the invention is used with a computer system. It then becomes possible to take advantage of the sophisticated standby features of the computer, and the fast restarts they make possible, in the event of periods of non-utilization that are of short or medium duration. For long periods of non-utilization, the device of the invention switches off completely the power supply to the functional group on reaching the end of the additional timeout period of long duration.

The device of the invention advantageously further includes means for setting the duration of the additional timeout period of long duration to match it to requirements. Expected durations may, for example, lie in the range 10 minutes (min) to several hours (h). Using a microcontroller simplifies managing timeout period of long duration. The means for setting the duration of the timeout period may be constituted, for example, by a switch having at least two positions, a potentiometer or variable resistance, or indeed a single pushbutton associated with the user performing an appropriate sequence of actions. Or they may be constituted, for example, by pressing the setting button for a particular duration and/or pressing it during a determined time window such as, for example, substantially at the time the switching on of the appliance initializes the procedure for setting the timeout period. Thereafter, setting the desired duration can be performed by pressing some number of times corresponding to a desired number of unit time intervals, for example lying in the range 1 min to 60 min. The setting made is confirmed and stored in non-volatile memory either explicitly, i.e. by pressing continuously for a duration longer than a determined value, or implicitly on coming to the end of an inactivity timeout period after the last button press. Naturally, these examples are not limiting and numerous other setting means are possible without going beyond the ambit of the invention, and in particular in embodiments of the device that are more elaborate, and that include display and setting means for other operating parameters.

Certain brands of TV set have chosen to control changeover from standby mode to operating mode by the presence of a signal on the slow switching input (i.e. pin 8) of the Peritel/SCART connector. When certain appliances such as terrestrial digital TV receivers are connected to the TV set via the SCART connector, major malfunctions can occur with state of the art standby power killers such as endlessly looping through switching appliances on and off, which can even lead to their destruction if not ended by unplugging them. The device of the invention advantageously includes means for making it impossible to supply the functional group of controlled appliances back until a sufficient length of time has elapsed after being switched off. A timeout period inhibiting any supplying back after switching off, e.g. having a duration lying in the range 15 s to 30 s, suffices to guarantee that no untimely restarting can occur when the switch-off conditions are satisfied.

State of the art standby power killers evaluate the power consumed by the controlled loads by measuring current in terms of a voltage drop across the terminals of a resistance, with the positive and negative excursion thereof being limited by the presence of a bilateral clamp circuit made of two diodes connected opposite ways round in parallel with the terminals of the resistance. That assembly provides the advantage of making it possible to use a relatively high resistance value so as to deliver a relatively large voltage in the linear zone before peak clipping, without requiring the resistance to dissipate much power. Components of relatively low power, of small size, and low cost can then be used. The drawback of that configuration with two semiconductors lies in its high degree of fragility when faced with surges and current peaks that might be drawn by the load. The device of the invention advantageously includes a power circuit that uses passive components only, both for measuring the current flowing in the controlled loads and for switching said loads. Power switching makes use of an electromechanical relay of appropriate dimensions for withstanding large current peaks when switching on certain controlled appliances. Current is measured within the device of the invention by measuring the voltage drop across the terminals of a shunt power resistor dimensioned as a function of the desired maximum power for the load. To keep the shunt resistor within a reasonable size, expense, and temperature range, an amplifier system of relatively large gain should be used in an analog embodiment. In a digital embodiment, an analog-to-digital converter providing sufficient resolution on the basis of a reference voltage that is as low as possible or a converter of lower performance but preceded by an amplification stage could be implemented in the device of the invention.

State of the art standby power killers that provide for setting switching thresholds do so by an analog potentiometer. It is difficult for the user to find a potentiometer position that is suitable for that user's appliances between the following two extreme situations: that in which the standby power killer cannot supply power to the controlled appliances, and that in which it cannot stop supply power to them.

One embodiment of the invention replaces the analog setting means with means for discrete setting of the decision-taking thresholds and having at least two positions. Setting then becomes simpler for the user to understand, in particular if the positions are associated with marking requiring a selection to be made between a main appliance that is small or large, between a TV with a small or a large screen, a computer that is a laptop or an office computer, high or low sensitivity, etc. Even simpler instructions would consist in instructions of the type "if it does not operate in this position, try the other". In certain embodiments of the invention, it can be advantageous to use an internal position sensor as the two-state setting means. Under such circumstances, it suffices, for example, to turn the housing of the device over in order to go from one setting value to the other without it being necessary to have any portion of the setting means projecting from the housing, thus making it easier to obtain good electrical safety. Naturally, it would remain within the ambit of the invention if the device were to include discrete setting means having more than two positions, e.g. three or even four positions.

In an embodiment of the device of the invention making use of digital technology, it is particularly advantageous to replace physical means for setting switching thresholds by a learning stage before the device is ready to be used.

When the device of the invention makes use of a special connector for the main appliance having the measurement circuit connected exclusively thereto, the invention advantageously makes provision for determining the switching threshold on the basis of at least one prior measurement of a magnitude that is substantially representative of the power consumed on standby. Under such circumstances, the switching threshold is obtained from the measured value by adding an offset magnitude thereto of constant value or of constant ratio relative to the measured value, e.g. 5% of the measured value. The offset can be obtained by calculation or it may be a discrete value, e.g. taken from a correspondence table. In a preferred embodiment of the invention, the training stage relies on measuring the standby power consumption and the working power consumption of the main appliance and on calculating the switching threshold(s) as a function of the two values obtained. The decision-taking threshold can be calculated to lie between those two values, e.g. on the basis of the arithmetic mean of the standby consumption and the working consumption. The value obtained is stored in a non-volatile memory for enabling the device of the invention to be used under conditions that are best matched to the characteristics of the connected appliance. This is particularly useful when the waveforms of the currents drawn by the main appliance vary significantly between standby and working modes. This applies with some topologies of switching mode power supplies of the kind used in consumer electronics. It is possible to implement the invention from low cost and simplified current measurement means that give results that are significantly influenced by the current waveform. The working and standby values taken into account serve advantageously to compensate for and mask possible anomalies associated with the effect of the current waveform on the measurement thereof, thus achieving the same functional result as would be achieved using more sophisticated means for measuring current that are substantially independent of waveform.

When the device of the invention does not use a special connector for the main appliance, so the measurement circuit is connected to all of the appliances in the functional group, then it is necessary to evaluate the difference between said main appliance switching from the standby state to the working state. It is the substantially instantaneous increase or decrease in the total current consumption from a value calculated on the basis of at least one prior measurement of at least one working consumption of the main appliance (from which an offset is subtracted) that is associated with decision making. Under such circumstances, the decision-taking threshold is obtained from the measured value by subtracting an offset magnitude of constant value or of a value that is in a particular ratio with the measured value, e.g. 30% of the measured value. The offset may be the result of a calculation or it may merely be a discrete value, e.g. a value obtained from a correspondence table. In one of the preferred embodiments of the invention, the training stage relies on measuring the standby and working power consumptions of the main appliance and on calculating the consumption threshold(s) as a function of the two values obtained. The decision-taking threshold can be calculated to lie between these two values, e.g. on the basis of the arithmetic mean of the standby consumption and of the working consumption. The value obtained is stored in a non-volatile memory, enabling the device of the invention to be used under conditions that are best matched to the characteristics of the connected appliance.

The invention also includes means for automatically stopping power supply to said functional group of controlled appliances, including the main appliance, when the power consumption is greater than a threshold that is substantially predetermined as a function of at least one characteristic of the device. This is a function for protecting the measurement circuit of the device and it is advantageous in that it can be reinitialized and in that it avoids having recourse to one or more physical components for providing protection such as a simple fuse, a thermal fuse, or indeed a circuit breaker in series in the measurement circuit. The self-protection threshold is determined by construction as a function of the electrical characteristics of the measurement circuit and/or of the maximum power value that can be measured. It is also advantageous to inhibit any supplying back of the functional group during a substantially predetermined period of time of duration that is related to the time required by the components of the measurement circuit to cool down after an automatic disconnection. The inhibition period following an automatic disconnection for self-protection purposes is advantageously indicated to the user by a visible change in the state of the device, e.g. by switching on a specific indicator light, or by a non-specific indicator light changing in color and/or flashing in a manner that is representative of the inhibition period.

In families there is a frequent problem of children or teenagers spending too much time devoted to watching television and/or using the computer. The device of the invention can solve this problem in one embodiment in which the device includes a clock. The clock has its own independent power supply, e.g. a lithium battery, and advantageously includes management based on the day of the week. The clock also includes programming elements enabling time periods to be defined that are associated with periods when said functional group of controlled appliances can be switched on, and other time periods when that is not possible. When management of the day of the week is also included, the time periods may vary as a function of the day of the week in order to take account of features of the calendar, such as days when children do not have school the day after, or days when they do not have school, and weekends.

In certain embodiments, the device of the invention includes elements for physically locking at least the connector for the main appliance and also elements for physically or logically locking the parts that enable the connected appliances to be switched on. These enable an authority, e.g. parents, or a holder of rights, to prevent at least said main appliance of the functional group of controlled appliances from being switched on. The physical locking of at least the connector for the main appliance, e.g. the TV set or the computer central unit, is necessary to prevent a user seeking to get round the ban by disconnecting the appliance from the device of the invention and reconnecting it to a normal outlet. The locking means also prevent the user from accessing the command means or inhibit the effect of any command means that might supply power to the functional group of controlled appliances. The locking means of the invention are advantageously associated with the embodiment that includes a programmer for determining forbidden periods in order to ensure that it is complied with. The locking elements may be of any kind, and by way of example they may be taken in non-limiting manner from the following: a mechanical key; a mechanical system requiring a combination of symbols; a reader for reading a card, a token, or biometric characteristics; a keypad or any other component for inputting a code; any kind of direct or indirect payment means.

More and more computers and computer peripherals, connected to wired networks or to wireless networks such as WiFi networks, are remote from the central unit that makes use of them. It becomes difficult to manage the electrical power supply to such remote appliances directly by connecting their power supply cords to the standby power killer device connected to the central unit. There may also be multiple central units within a given network, all sharing a plurality of peripherals. One embodiment of the device of the invention solves this problem by integrating elements for remotely controlling one or more extensions associated within a network.

Standby power killer devices of the invention each having their own measurement part(s), decision-taking part(s), switch part(s), and information transmission part(s), can be associated with extensions that have receiver part(s) and switch part(s), by any means that enable a common code to be allocated to all of the transmitter and receiver devices of a given network. Information is advantageously transmitted at intervals with a repetition rate that is variable within certain limits, e.g. substantially randomly, in order to reduce the risks of collisions.

The associated extensions are arranged to supply power to the appliances to which they are connected so long as a device within the same network is itself in the state where said functional group that is directly connected thereto is supplied, and to stop supplying power to the appliances that are connected thereto when all of the standby power killer devices within the same network are in the state in which the supplying of power to the functional groups that are directly connected thereto is stopped. It would not go beyond the ambit of the invention if, for reasons of economies of scale or of simplification, the functions of a standby power killer device and of an extension were to be combined in a single kind of device capable of being configured to perform one or other of those roles, depending on requirements.

The main object of the invention is to make savings by eliminating the useless electricity consumption of appliances on standby. The device is for users who are generally sensitive to questions of energy efficiency and who need to know the consumption characteristics of one or more appliances from time to time. Given the small extra expense associated with adding the function of measuring or evaluating consumption to a standby power killer device of the invention, it is advantageous to propose this function in certain embodiments. This function can also be proposed together with functions of evaluating the savings achieved and/or functions of programming times, in that they make use of substantially the same technical means, such as, for example: a microcontroller, measurement means, display means, and setting means.

The energy consumption of the appliance(s) connected to the device of the invention can be calculated on the basis of the power measured by taking account of the current flowing through the load and the voltage across its terminals. Depending on the desired accuracy, the measurement means may optionally be calibrated during manufacture.

It is also possible, without going beyond the ambit of the invention, to evaluate energy consumption on the basis of the single measurement that is essential to enable the standby power killer of the invention to operate, i.e. measuring the current that flows through the controlled load. Energy consumption is evaluated by evaluating the power absorbed by the load, i.e. multiplying the measured current value by a constant representative of the nominal voltage of the electricity network, e.g. 230 volts (V) in Europe and 110 V in North America. The accuracy obtained for the evaluated power is a priori less than that obtained by measuring the current flowing through the load and the voltage across its terminals, however it may be sufficient for satisfying consumer needs for information, and for doing so at a low cost.

The constant that is representative of the nominal voltage of the electricity network may be determined when the device is designed, forming part of identical calculation elements for all of the devices. Better accuracy can be obtained by adding a calibration procedure on manufacture, advantageously constituting part of the final unit testing of the devices. The calibration procedure may comprise the following steps, for example:

powering each device at the nominal voltage of the electricity network, e.g. 230 V in Europe or 110 V in North America;

connecting a load of known power;

extracting an internal coefficient from the value measured by the device, which value is based on a first known value;

using parts external to the device to calculate an additional correction coefficient for application, or a new corrected value of the first coefficient used by the calculation devices within the device, so that the measured value corresponds to the known value of the load; and storing the additional correction coefficient, or the corrected value for the first coefficient, in a memory in the device.

The same type of calibration procedure can be implemented when measuring power that takes account of the voltage across the terminals of the controlled load.

Means for presenting the measurement information or the evaluated energy consumption to the user are implemented in the device of the invention, e.g. in the form of embedded display means. The information can be given in physical measurement units, e.g. watt hours or kilowatt hours, and/or in monetary units and/or as a graphical representation (e.g. a bar graph, a visible surface or pictogram of a size and/or having a lighting level in relationship with the said information). A display in monetary units requires a prior stage of selecting corresponding tariff rules preprogrammed in the device or of the user inputting tariff data via appropriate means. Taking account of tariff differences depending on predefined periods of time can advantageously be made available if the device includes a clock. The information concerning the mean power absorbed by each controlled load can also be presented to the user without going beyond the ambit of the invention.

The main aim of the device of the invention is to achieve savings by eliminating the useless consumption of appliances on standby. In certain embodiments, the inventive device may include means for evaluating the savings achieved, e.g. by keeping track of the amount of time during which the device disconnects the power supply to the controlled appliances, and calculating the amount of energy that the disconnection represents on the basis of the power those appliances consume while on standby. The values for the standby powers of the appliances of said functional group that the device of the invention needs to know can be input by the user via a suitable man-machine interface, or said powers may also be measured by means included in the device, or indeed they may be evaluated from the measured current flowing through the loads. In practice, an estimate of the power consumed on standby suffices to give an order of magnitude for the savings achieved.

A simple estimate of the power consumed on standby is advantageous in that it can be provided by the means already used in the device of the invention for performing its basic operation, and furthermore need not require any calibration for the desired level of accuracy.

Calculating the savings achieved by eliminating standby consumption is done on the basis of the value of a measurement or an evaluation of the power that would be absorbed by the controlled appliance(s) had they not been disconnected by the device of the invention.

For example, it is possible to perform calculations to evaluate the power saved, and then the energy saved, on the basis of a measured or evaluated value previously stored in memory. Advantageously, the measured or evaluated value for the power absorbed by the load, or indeed for a magnitude that is representative thereof, can be stored between the time when the conditions are satisfied for switching off the functional group of controlled appliances and the moment when the power supply to those appliances is indeed switched off. Everything said above concerning obtaining a measurement or an evaluation of the power in the controlled loads depending on the desired level of accuracy, and also concerning presenting information to the user in terms of physical measurement units and/or monetary units and/or as a graphical representation applies likewise to evaluating the savings achieved.

In another aspect of the invention, multiple connection means are used to avoid the user needing to add external multi-outlet power strips in order to connect the plurality of controlled appliances making up the functional group. The multiple connection means may also include connectors that are dedicated to specific functions and that are identified as such. For example, in the embodiment of the invention in which the embedded measurement means measure only the power consumed by the main appliance, without taking account of the power consumed by the secondary appliances, a connector dedicated to the main appliance and identified as such should be provided, with other connectors that are electrically connected in parallel advantageously being provided for connection to the other appliances of the functional group and being identified as such. An additional connector that is continuously supplied and that is identified as such may advantageously be added to the device of the invention for connecting equipment that needs to be powered continuously, such as programmable video recorders in an audiovisual functional group or a fax modem or indeed an ADSL adapter in a computer functional group.

In addition, the multiple connection means used may be of any type, for example by combining standardized outlets with a ground connection and standardized outlets with no ground connection, so as to correspond both to the different types of connector fitted to appliances for connection and to provide a connector block that is more compact and/or less expensive.

The technical device of the invention may advantageously be associated with another device providing complementary functions. These auxiliary functions may be associated with appearance, for example. For example, the technical device of the invention may be put in a casing. It is thus possible to separate the function of providing a casing of attractive appearance from the function of providing a technical casing. The technical casing means take account of safety requirements such as the materials used providing electrical insulation and not propagating flame. The appearance outer casing for the technical device can be made using any type of material, including materials unsuitable for directly casing an electronic device that includes portions at the same potential as the electricity network and that might heat up. It is thus possible to make use of a plastics material foam, precious materials, wood, metals, ceramics, glass, etc.

The appearance outer casing may also serve to combine the advantages of a technical device that is mass-produced with the advantage of including it in a variety of articles of pleasing appearance that can be manufactured on a much smaller scale, or may even be made by hand. It can also be advantageous to provide the device of the invention in the form of an electrical appliance for mounting flush or projecting, so as to constitute part of the electrical installation in a building. Elements making it difficult to remove the device should advantageously be provided so as to reduce the risks of theft of installations in public or communal locations.

It is also possible to integrate the device of the invention in some other device for functional reasons. Such auxiliary functions may be to change the appearance of the device, to act as a communications medium, e.g. for promotional, advertising, or information purposes, that can be personalized by the user. Such auxiliary functions may also be one or more functions in addition to the main function of the invention, as in the following non-limiting examples: a lamp, an econometer, an uninterruptible power supply, a means for providing protection against surges on the electricity network and the effects of lightning, possibly also including connections to other wired networks such as telecommunications lines, computer networks, antenna distribution . . . .

The lamp function is particularly pertinent in that it satisfies a need that is ergonomic. Within an audiovisual functional group, the lamp function is useful for general lighting suitable for use while watching TV. In a computer functional group, the lamp function can advantageously be in the form of a desk lamp. Whatever the type of lamp associated with the invention, it is advantageously electrically connected in such a manner that its lighting function is automatically switched on when the main appliance is in operation and is automatically switched off when the general group is switched off. A switch may advantageously be provided in series with the power supply of the lighting source in order to give the user the possibility of switching off the lighting unconditionally.

The device of the invention may be integrated in a said main appliance, for example in a computer, in a TV set, in a Hi-fi system or in any other appliance that may save energy by implementing the invention.

The device of the invention may also be integrated in or within other devices providing additional functions that are not associated with the main function of the invention, as in the following non-limiting examples: clock, calendar, indoor and/or outdoor thermometer, office equipment, various gadgets.

In some embodiments, a manual switching off command may be added in order to allow the user to accelerate the switching off process if needed. This can apply for example when the timeout before automatic switching off is set for a long duration. Manual switching can be done by adding a dedicated "off" button or by using the same button as for switching on, for example introducing toggle behavior. It is advantageous to make manually switching off artificially more difficult in order to reduce the risk of switching off by mistake. This can be achieved by pressing the key for a predetermined longer duration, and/or for a known number of times . . . .

In some embodiments, a modular approach based on optional connectable functional modules can be chosen in order to bring flexibility in product design and/or to offer a capability for optionally extending the features of the basic power saving function block at a later date in the field.

One of the main characteristics of the invention is the fact that it is potentially universal, i.e. a priori its electronics can operate with any type of functional group, e.g. equally well with a television set and the audiovisual equipment associated therewith, or with a computer and its peripherals. Nevertheless, it would not go beyond the ambit of the invention if a standby power killer were to be specialized for some particular given functional group, e.g. for reasons of marketing, cost optimization, or adding additional functions that are specific to one particular type of use.

BRIEF DESCRIPTION OF THE DRAWINGS

The invention can be readily understood from the following detailed description given with reference to the accompanying drawings in which like reference numerals are used to designate like elements. In the figures:

FIG. 14 shows the device of the invention associated with an appearance function that changes in appearance, e.g. to make it fun to play with.

DETAILED DESCRIPTION OF PREFERRED EMBODIMENTS

Figure 1:
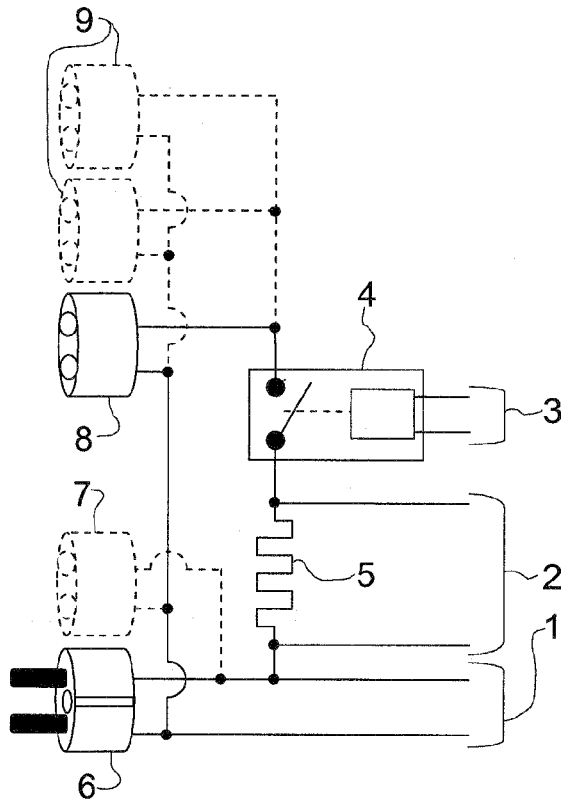
FIG. 1 shows the power circuit of a device of the invention when all of the loads constituting the functional group of controlled appliances are connected in parallel, including the main appliance within said functional group.
Figure 4:
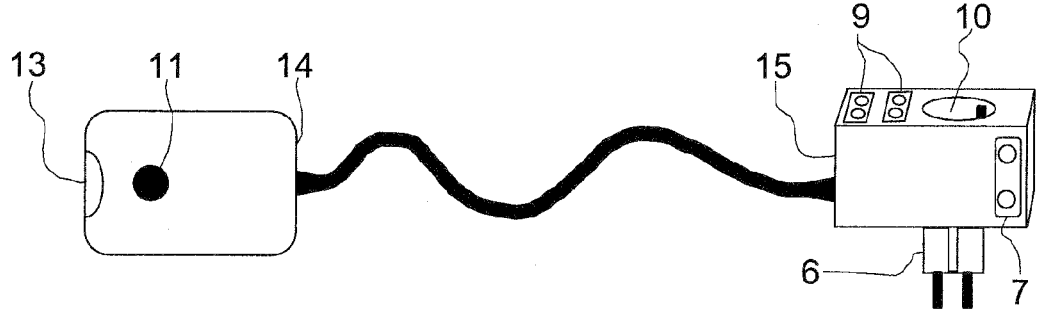
FIG. 4 shows an embodiment of the invention in a compact embodiment.

Other features and advantages of the invention appear further from the following description. In the accompanying drawings given as non-limiting examples:

The embodiment of FIG. 1 corresponds to the power circuit of the device of the invention when all of the loads constituting the functional group of controlled appliances are connected in parallel, including the so-called "main" appliance within the functional group. The main advantage of this embodiment is that the connector block can be connected to the electronics of the invention by a cable that contains only three conductors. An additional advantage is that it is possible to reduce the connector block to a male plug 6 and a female outlet 8, if necessary making use of external power strips for connecting a plurality of appliances and/or an appliance that needs to be connected to the electricity network permanently. In addition, all of the female connectors 9 are equivalent, except for an optional connector 7 that provides continuous power, thereby reducing the risks of user error. The drawback of this embodiment is little latitude in selecting the powers of the appliances used, both with respect to the main appliance and with respect to the other appliances of the functional group. Nevertheless, in practice it is possible to find a compromise that gives full satisfaction with most appliances. This is the embodiment that is most appropriate for a compact embodiment as shown in FIG. 4 in that it minimizes overall size and the cost of the cable connecting the connector block to the electronics of the device. Naturally, it would not go beyond the ambit of the invention if measurement were to apply to the entire functional group of controlled appliances in an embodiment other than that shown in FIG. 4.

The extension of the wires 1 is for delivering power within the device, the extension of the wires 2 is for the measurement means, the extension of the wires 3 is for controlling the relay, the components 4 and 5 respectively representing the switching relay and the shunt resistance for measuring the current flowing in the connected controlled loads.

Figure 2:
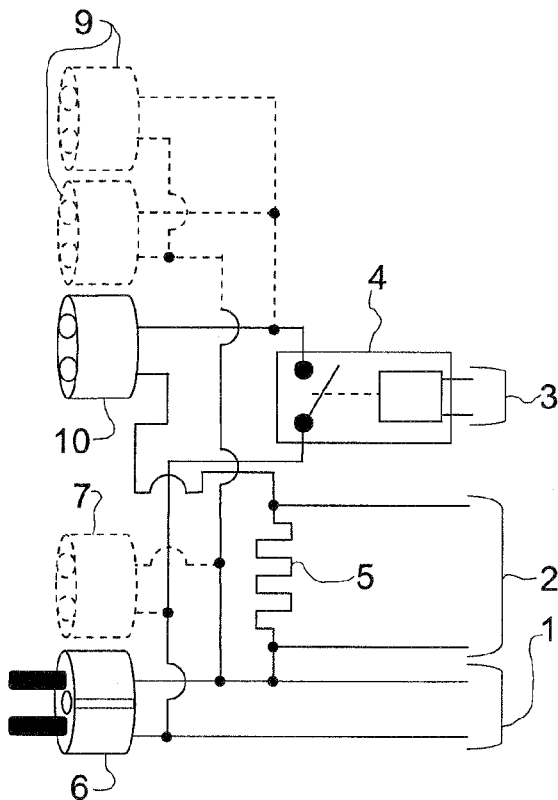
FIG. 2 shows the power circuit of the device of the invention in an embodiment that differs from the preceding embodiment in that a specific connector is for use with the main appliance of the functional group.
Figure 3:
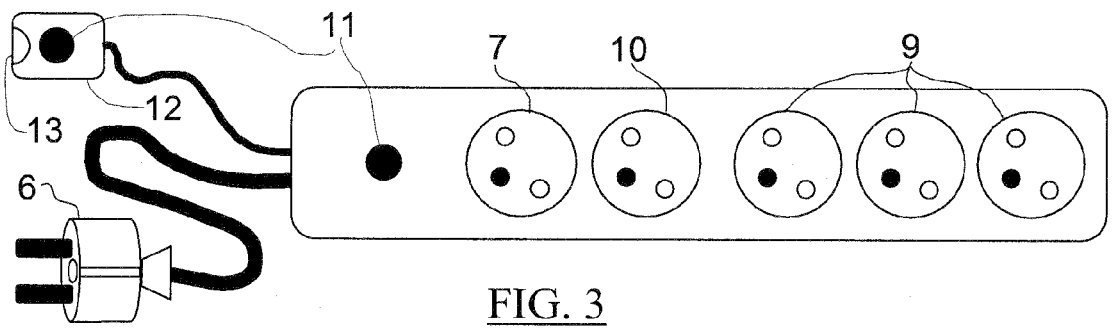
FIG. 3 shows an embodiment of the device of the invention in a multiple-outlet power strip embodiment.

The embodiment of FIG. 2 corresponds to the power circuit of the device of the invention in an embodiment that differs from the preceding embodiment in that a specific connector 10 is for the main appliance of the functional group. The advantage of this preferred embodiment is greater control over the operating characteristics of the device, in particular by completely decoupling the characteristics of said main appliance from those of the other appliances in the functional group. In addition, it is the embodiment that gives the device of the invention the greatest potential for being universal, in particular in that it can operate with a main appliance that consumes less electricity in operation than all or some of the connected secondary appliances. All of the appliances of the functional group are disconnected, but the measurements leading to decisions being taken in accordance with the invention apply only to the consumption of said main appliance. In this embodiment, the connector block is connected to the electronics of the invention by a cable having four conductors. This is the embodiment that is most suitable for a power strip embodiment as shown in FIG. 3, in that the internal cabling of one additional conductor constitutes negligible extra cost. Naturally, it would not go beyond the ambit of the invention if a measurement circuit were to be used that is dedicated solely to the main appliance in an embodiment other than that shown in FIG. 3. References common with FIG. 1 relating to components and to the wire extensions have the same meanings.

The embodiment of FIG. 3 corresponds to a power strip embodiment that is connected to the electricity network by a cable terminated in a male plug 6. The electronics of the device is placed in the same one-piece housing as the connectors. In addition to the connectors for the functional group 9, 10, it is possible to add a connector 7 that is powered continuously, and when the internal wiring is as shown in FIG. 3, it is possible to have a specific connector 10 for the main appliance. Where appropriate, the on command 11 can be provided remotely or duplicated at 12 without going beyond the ambit of the invention. Remote on command means considerably improve the ease of use and the appearance of the device of the invention in that only the remote command means is visible and positioned in a location that is easy to access. The main block can advantageously remain on the floor and if possible it can be hidden. The term "remote command means" is used to designate any means for enabling the user to command the supply of power to the functional group of controlled appliances without it being necessary to act physically on the main portion of the device of the invention. This may be constituted merely by a remote pushbutton 11 connected by a cable to the main portion of the device of the invention, which button may also include a receiver 13 for infrared remote control signals. The remote command means 12 may also advantageously be connected to the device by a wireless connection, e.g. by radio with coding means to ensure that its association with the device of the invention for which it is intended is exclusive, so as to ensure that a remote command button is associated with only one device of the invention. It is also possible for the remote on command button to be virtual by adding means for receiving infrared remote control signals, means for picking up and recognizing characteristic sound signals such as whistling or clapping the hands, voice recognition means, even simplified voice recognition means, without that going beyond the ambit of the invention.

The embodiment of FIG. 4 corresponds to the compact embodiment. The electronics of the device is separated from the connector block which, in its minimum version, may be constituted by a nested male/female connector at the end of a single cable, or connectors at the ends of two separate cables, one fitted with a male plug for connection to the electricity network and the other cable terminated by a female outlet for the functional group of controlled appliances, that may possibly be constituted by no more than said main appliance. The electronics of the device of the invention is housed in a housing 14 that is placed in a location that is easy to access. If the electronic device includes means 13 for receiving infrared remote control signals and is used with audiovisual appliances, then it needs to be placed in such a manner as to be able to receive these signals, e.g. on the TV set. The connector block may comprise a male plug 6 and a plurality of female outlets, with a ground connection 10 or without a ground connection 9 depending on the applications concerned, and with or without one or more continuous power connectors 7 connected in parallel to the main connection 6 for powering appliances that need to be powered unconditionally. Depending on whether the measurement relates to the overall consumption of said functional group or only to the consumption of said main appliance, the cable connecting the main housing 14 to the connector block 15 will have respectively three conductors or four conductors.

Figure 5:
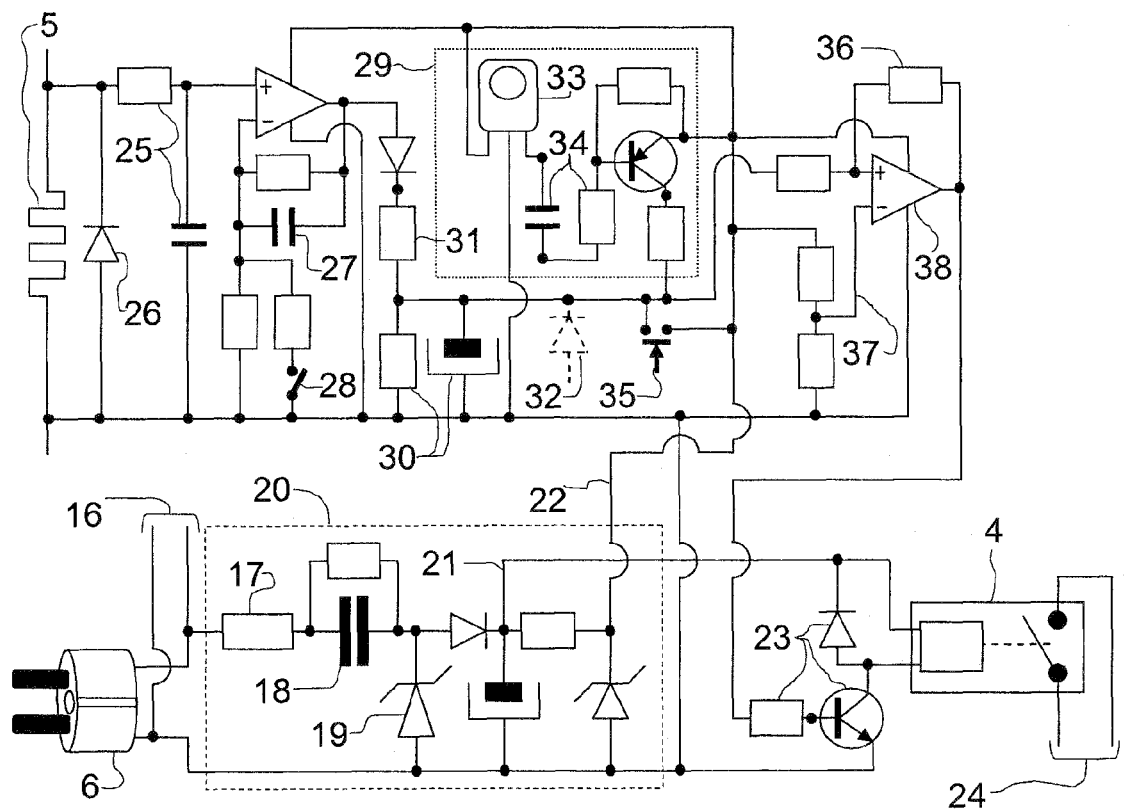
FIG. 5 shows the electronic circuit of the device of the invention in an analog embodiment.

The embodiment of FIG. 5 corresponds to the analog embodiment of the device of the invention. A signal representative of the current and thus of the power passing through the load(s) concerned is extracted from the terminals of the shunt resistor 5. This resistor may be inserted in a power circuit, e.g. of the kind shown in FIG. 1 or of the kind shown in FIG. 2. This resistor advantageously has a resistance that is as small as possible, e.g. 0.10 ohms (Ω) to 0.47Ω, so as to be capable of dissipating little heat even with load powers that might exceed 500 watts (W), while nevertheless being capable of being constituted by a resistor of a model that is relatively compact and inexpensive, e.g. a resistor having nominal power lying in the range 3 W to 7 W. The half-wave that is not used by the following asymmetrical electronics is advantageously removed from the symmetrical AC signal taken from the terminals of the shunt resistor a diode 26 connected the appropriate way round. The signal is advantageously presented to a first resistor-capacitor (RC) network 25 acting both as a low-pass filter and an integrator. This network contributes to attenuating the instantaneous current peaks that certain chopper power supplies produce in certain controlled appliances connected to the device. The filtered signal is then amplified in a manner that is selectively greater for its low frequency components, typically those that are less than or equal to the frequency of the electricity network. This is done by at least one capacitor 27 in the feedback circuit of one or more operational amplifiers possibly connected in cascade in order to obtain the total gain needed to ensure that the device of the invention operates properly. A sensitivity setting 28 with at least two positions can advantageously be added in the amplifier system so as to be able to cover the entire range of needs corresponding to all sizes of TV set and also to the characteristics of computers from laptop models up to the largest configurations. The signal is then applied to an RC network 30 via a diode and a resistor 31 to deliver a constant voltage that is substantially representative of the mean power consumed by the load. The charging resistor 31 connected in series, and the discharging resistor connected in parallel with the capacitor are dimensioned so as to obtain a compromise that is relatively insensitive to transient phenomena such as surges on switching on, so as to obtain a reaction time that is appropriate during all stages of operation of the device, and so that its sensitivity corresponds to the powers of the controlled appliances to be connected. The DC voltage that is substantially representative of the mean power consumed by the connected load(s) is presented to a comparator in charge of decision making that either keeps the load switched on or switches it off by making comparison with a predetermined threshold, e.g. in the form of a reference voltage 37 applied to the inverting input of the comparator. Hysteresis is advantageously added, e.g. by placing a positive feedback resistor 36 between the outlet from the comparator and its non-inverting input, in order to eliminate any risk of instability. The output from the comparator controls the state of the power relay via an appropriate interface 23, e.g. constituted by an NPN transistor, its base resistor, and a protective diode. The principle of operation is as follows: at rest the contacts of the relay are open and the functional group of controlled appliances is disconnected from the electricity network. A user seeking to make use of equipment connected to the device of the invention commands its supply by means that may be direct or indirect. For example, depending on the means implemented in the device, this can be done by pressing on a pushbutton that is local to the device or that is remote therefrom, by emitting a signal by a radio or infrared remote control that may be specific to the invention or shared with some other appliance, by emitting a characteristic sound signal, or by any other means having the effect of applying a voltage greater than the threshold for deciding to maintain the on state of the device, and that lasts for a substantially predetermined length of time. This transient action causes the contacts of the relay to close and consequently supplies said group of controlled appliances during a length of time that is substantially determined by the RC network 30. During this time lapse, the user must confirm that the appliances are to be switched on, where appropriate by causing said appliance to go from the standby state to the working state by using the means provided for this purpose for that appliance. If there is no confirmation of the on state observed by the device of the invention within the time provided by the consumed power going over the off decision threshold, the relay contacts open and the appliances of the functional group are disconnected from the electricity network. At any moment, even after observing conditions for maintaining an on state, the device of the invention switches off the power supply to all of the appliances of the functional group if the power consumed by the main appliance goes below the off decision threshold. This may happen equally well by said main appliance being switched off completely or by it being put on standby by the appropriate means, where applicable. The optional subassembly 29 is arranged to receive the signals emitted by the remote controls usually provided with audiovisual appliances. A standard integrated detector 33, e.g. a model comprising a demodulator for signals at a carrier frequency of 38 kilohertz (kHz), and having an output that is active in the low state, charges the series RC network 30 with pulse trains at the power supply voltage of the comparator via a PNP transistor. The connection between the output from the detector 33 and the base of the transistor takes place via a series RC network 34 having a value that is a compromise allowing the reduction of the influence of interfering signals generated for example by light sources, while nevertheless making the device functional, if possible, with all remote control standards on the market. The PNP transistor intrinsically acts as a diode enabling the RC network to charge to the highest voltage amongst the available sources. Any other on command means must deliver a sufficient voltage to the RC network 30 via the PNP transistor or a diode having its anode directed towards the voltage source and together with a resistor connected in series with the voltage source, where appropriate. Resistors having appropriate resistances are advantageously connected in series with the voltage sources for charging the RC network 30 so as to cause the reaction times to vary in appropriate manner depending on the source. Thus, pressing the on button 35 will have an effect that is immediate because its charging resistance is zero, while the remote control signal receiver will require a key press for a duration of about 10 s, for example, in order to eliminate any risk of a false start, and the measurement circuit offers a time constant that reduces the influence of transient phenomena. In addition, the resistance of the charging resistor 31 connected to the output of the measurement circuit is associated with the decision thresholds in that it forms a voltage divider bridge with the resistor for discharging the RC network 30 before comparison. Naturally, it would not go beyond the ambit of the invention if amplifier and/or filter stages were to be added, if components were to be added for improving operating stability and immunity to interference, if bipolar transistors to be replaced by MOS transistors or by any other devices having equivalent functions, if both half-waves of the measurement signal were to be used, if the electronics were to be powered with symmetrical voltages, if the hysteresis of the comparator were obtained by modifying the threshold voltage as a function of the output state instead of modifying the input voltage.

The low voltage power supply 20 for the device advantageously makes use of one or more capacitors 18 as elements serving to drop the voltage of the electricity network. In addition to advantages of cost and compactness compared with a conventional solution using a low power voltage-dropping transformer, the phase shift imparted by the capacitor eliminates practically all active consumption by the device, thus making its operation free for the user since electricity meters do not measure reactive energy. This characteristic can also be considered as an advantage for the supplier of electricity in that the capacitors connected to the network contribute to compensating for losses due to inductive loads, which are in the majority. The capacitor power supply includes a resistor 17 connected in series with the capacitor to limit current peaks to values that can be withstood by the semiconductors performing voltage regulation functions during the working half-cycles, and the flow of current during the non-used half-cycles, as is done for example by the zener diode 19. Such current peaks can appear during transients and in the presence on the electricity network of interference signals of high energy with having high values for dV/dt. A discharge resistor is advantageously connected in parallel with the capacitor 18 to eliminate any risk of electricity being discharged into the fingers of a user touching the contacts of the power supply immediately after unplugging the device. The volume and the cost of the capacitor 18 are directly linked with the magnitude of the current to be delivered. In order to minimize these factors, it is advantageous to power the power relay at a first voltage 21 that is relatively high, e.g. 24 V or 48 V, in order to minimize the current that needs to be delivered to the relay for a given power of coil. A second voltage regulation stage provides a second voltage 22 matching the requirements of the electronics that enables the device to function. Other capacitive power supply topologies could be used without going beyond the ambit of the invention.

Figure 6:
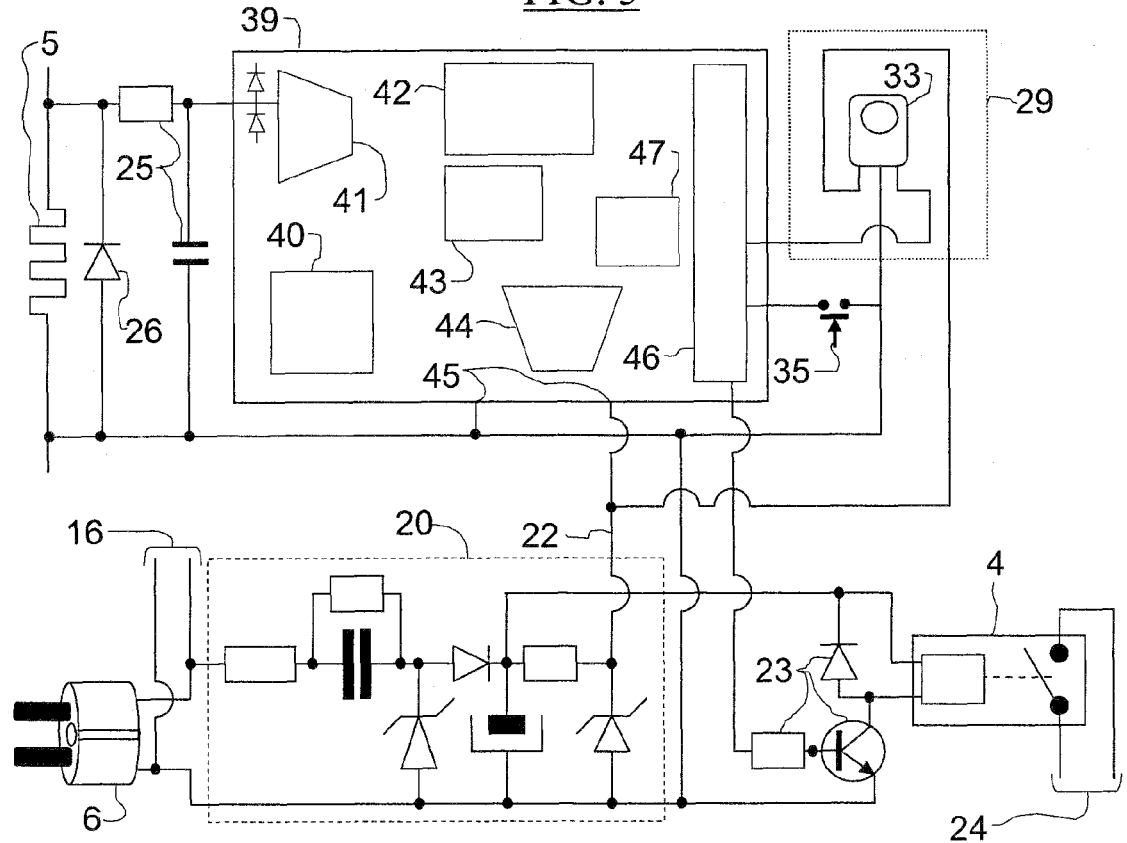
FIG. 6 shows the electronic circuit of the device of the invention in a digital embodiment.

The embodiment of FIG. 6 corresponds to a digital embodiment of the device of the invention. This embodiment is more preferred in that the behavior of the device can be controlled better than it can by implementing analog solutions, and additional functions can be added at a marginal cost that is small or zero. Most of the hardware components are identical to those of FIG. 5, and in particular the power supply circuits 6, 16, 20 the switching circuits 4, 23, 24, and the measurement input circuits 5, 25, 26. The basic functions of the device of the invention are implemented in this example by a microcontroller 39 having embedded peripheral features that are adapted to requirements and in which an appropriate program is implemented. It is preferable to use a microcontroller 39 having low electricity consumption and a wide range of power supply voltages 45, and that includes: an analog-to-digital converter 41 with its reference voltage source and presenting resolution of at least 10 bits, having its inputs protected; a clock source 40 for saving in terms of cost and size; a logic and arithmetic calculation unit 44; a scratch pad random access memory 43; a read-only memory or flash memory 42 containing the program specific to the device of the invention; one or more hardware timers 47; input/output pins 46 for interfacing, if necessary, with external command 35, 29 or action means 23, and where appropriate, a non-volatile memory for storing operating parameters e.g. flash or ferom type of memory having self writing capability. Of course, it can also be a memory of the EEPROM type. The "ATtiny25" from "Atmel" (registered trademark) can be used for example, but other models from the same supplier and its competitors can also be suitable. The use of a microcontroller is advantageous in that it significantly reduces the cost of adding additional functions. When adding command means for switching on, such as subassembly 29 for receiving infrared signals, it is possible to make a direct connection with a standard detector 33, given that the interference filtering and signal processing can be performed by software. Similarly, when adding sound signal command means, the hardware interface between the microphone and the microcontroller can be reduced to a minimum, with the signal processing and recognition work being implemented using digital techniques. Furthermore, the device of the invention can be made ergonomic by adding indicator lights such as light-emitting diodes (LEDs) and/or by adding buttons for making it easier to adjust operating parameters in procedures that can associate presses on the buttons with flashes of the lights.

Figure 7:
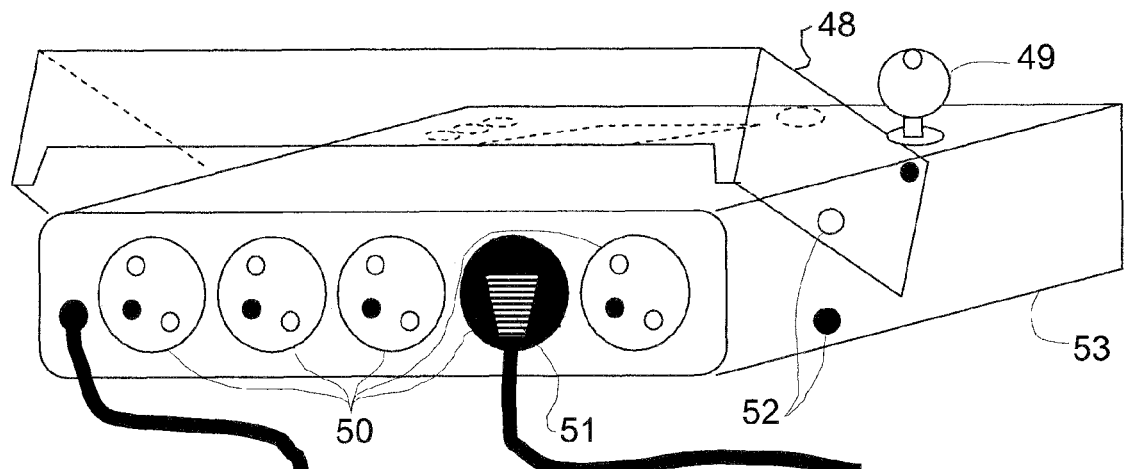
FIG. 7 shows an embodiment of the device implementing means for locking the connectors of connected controlled appliances and also parts for programming periods of time during which switching on is authorized and others during which it is not authorized.

The embodiment of FIG. 7 corresponds to the embodiment 53 of the device that makes use both of means 49, 52 for locking the connectors 50 for connection to the controlled appliances, and also of means for programming time periods during which switching on is authorized and others during which it is not authorized. This embodiment is more particularly intended for controlling the use of audiovisual and computer appliances by teenagers in a family or institutional context. Mechanical means 48 mounted to pivot about an axis, and capable of being unlocked, e.g. by a key 49 and means 52, give access to the female connectors 50 so as to enable any male connector 51 to be freely connected thereto.

Figure 8:
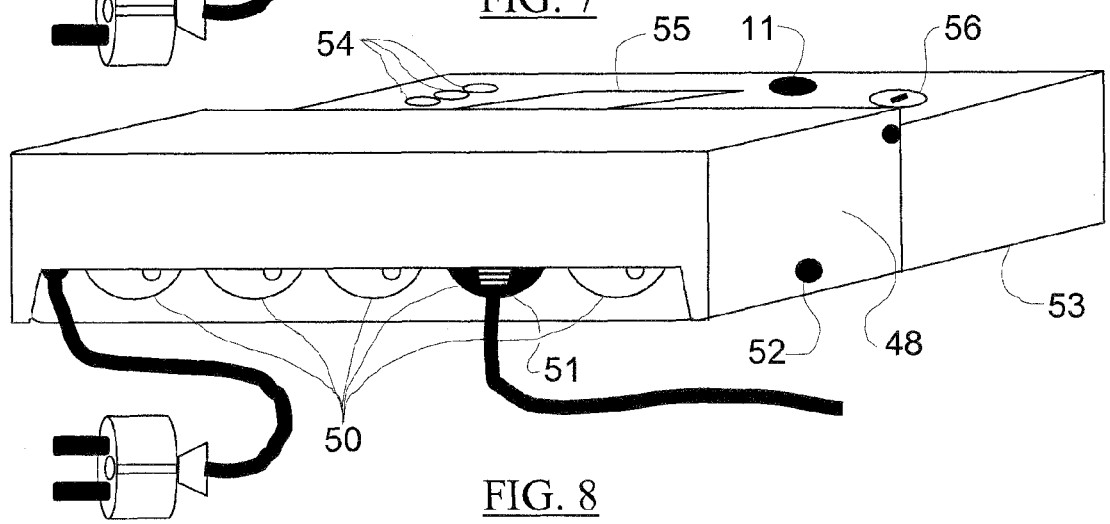
FIG. 8 shows the device of the invention in an embodiment of the preceding FIG. having elements for blocking access to the female connectors.

The embodiment of FIG. 8 corresponds to the embodiment 53 of the preceding FIG. with the means 48, 52, 56 for blocking access to the female connectors 50 being shown in the locked position, preventing any of the male connectors 51 from being removed. When locked, the device is arranged to prevent any setting that might enable the controlled appliances to be switched on, e.g. by the on control 11, other than during those time periods where switching-on is authorized. Setting the clock and programming periods during which switching-on is authorized or not authorized can be performed by any means, e.g. using buttons 54 and a display 55. Naturally, the device is arranged to make it impossible to modify the time periods whenever it is in the locked position.

Figure 9:
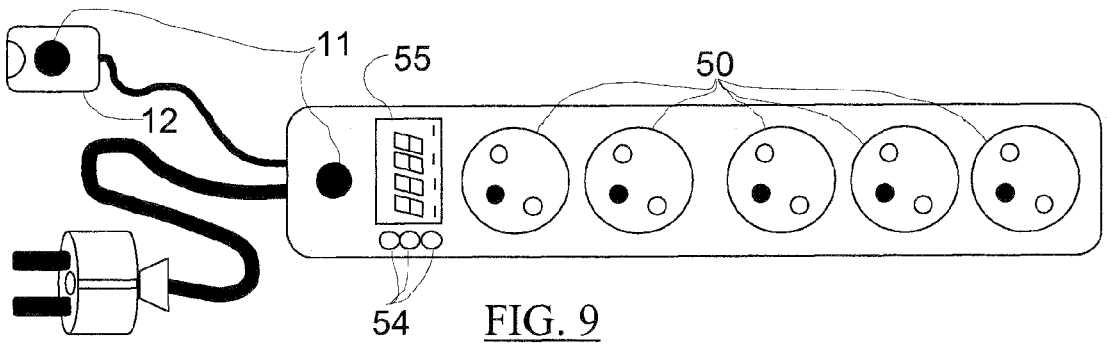
FIG. 9 shows the device of the invention in its multiple-outlet power strip embodiment including the connectors and also integrating display and setting means together with internal means for enabling sophisticated functions to be made available.

The embodiment of FIG. 9 corresponds to a power strip embodiment that includes the connectors 50 and that also includes display 55 and setting 54 means together with internal means enabling sophisticated functions to be made available. These functions can be measuring or evaluating the energy consumption of the loads connected and/or evaluating the savings achieved by implementing the invention, or indeed any setting of the operating parameters of the device. The on control(s) 11 may advantageously be positioned remotely at 12.

Figure 10:
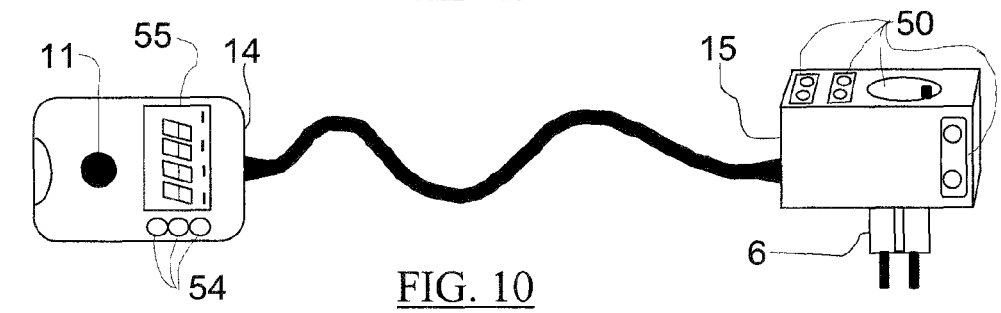
FIG. 10 shows a device of the invention in its compact embodiment.

The embodiment of FIG. 10 corresponds to the compact embodiment. The device presents the same characteristics and the same operating potential as in FIG. 9. The electronics, the command means 11, 54, and the display means 55 are united in a housing 14 that is different from the housing 15 containing the connectors 6, 50.

Figure 11:
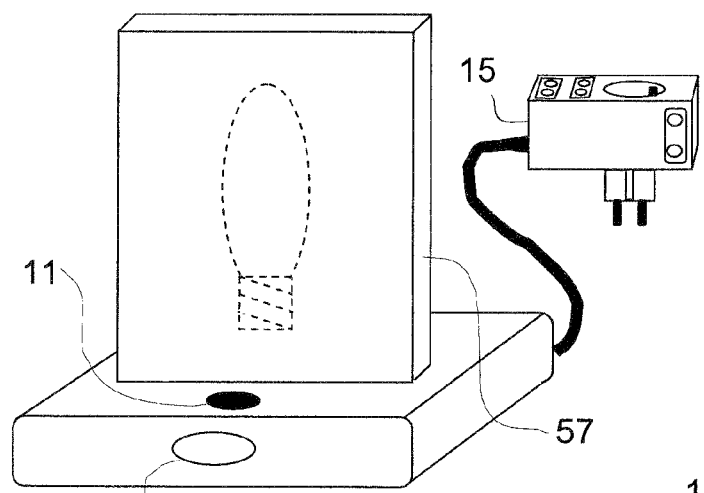
FIG. 11 shows the device of the invention associated with a lighting function adapted to managing a functional group of audiovisual appliances.

The embodiment of FIG. 11 corresponds to the device of the invention associated with a lighting function that is adapted to managing a functional group of audiovisual appliances. In this example, although the core of the device of the invention presents a universal nature relating to the type of controlled appliances that can be connected, it is associated with an additional function that is dedicated to a specific kind of use. That does not go outside the ambit of the invention. The lamp 57 contains the electronics of the device in its base and the connectors are positioned remotely in the form of a block 15. The lamp is preferably arranged to provide indirect lighting complying with ergonomic requirements, and if possible using a low-consumption source for the sake of being compatible with the object of the invention. The on command means 11, advantageously associated with a remote control signal receiver 13 are arranged to facilitate use. Naturally, it is possible to opt for a power strip embodiment to be used in this functional association without going beyond the ambit of the invention.

Figure 12:
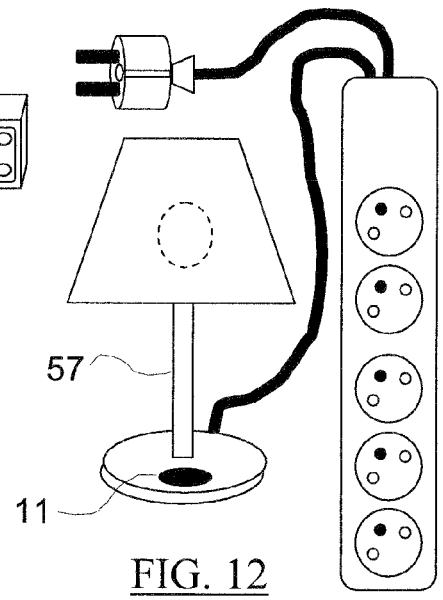
FIG. 12 shows the device of the invention associated with a lighting function adapted to managing a functional group of computer appliances.

The embodiment of FIG. 12 corresponds to the device of the invention associated with a lighting function adapted to managing a functional group of computer appliances. The lamp 57 that is most suitable under such circumstances is of the desk lamp type. The on control button 11 is advantageously integrated in the base of the lamp. A switch connected in series with the power supply for the light source or indeed a lighting level detector associated with appropriate switch part(s) can be added to save respectively manually or automatically on the energy that would be used for lighting when no lighting is necessary. Naturally, it is possible to opt for the compact embodiment in this functional association with going beyond the ambit of the invention.

Figure 13:
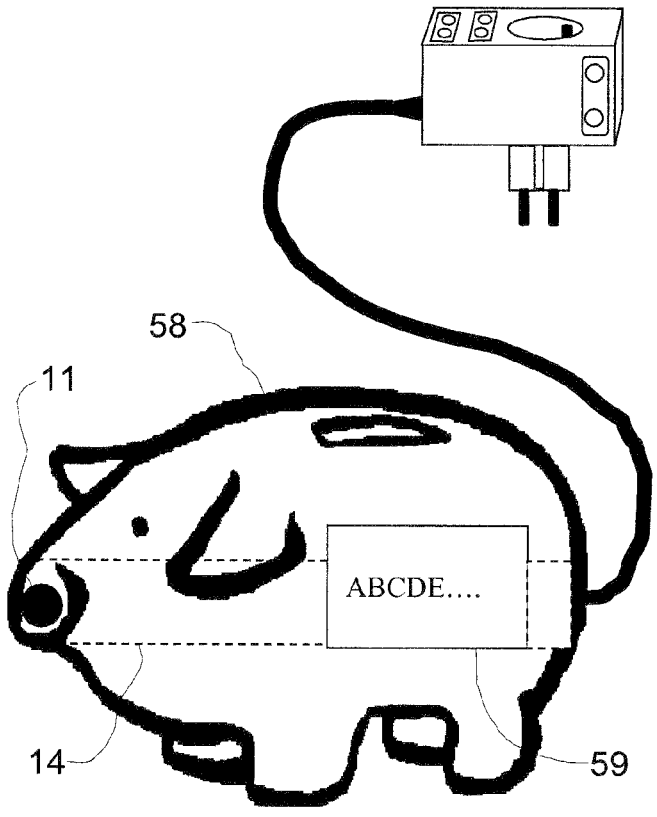
FIG. 13 shows the device of the invention associated with an appearance function in which the technical device of the invention is enclosed in a case of arbitrary shape.

The embodiment of FIG. 13 corresponds to the device of the invention associated with an appearance function in which the technical device 14 of the invention is housed in a case of arbitrary shape 58. The shape of pleasing appearance is arranged to give access to the on command means 11 or to transmit the action of a user thereto. The external shape may include a function that is auxiliary to the invention, for example a piggy bank, a clock, a thermometer, a pencil box, a photo frame, a "post-it" support, etc. Where necessary, a communication function 59 can be added in order to display a trademark and/or a message. Such a message could be for example "I save energy!", "I protect the planet!" . . . . Naturally, it is possible to opt for the power strip embodiment with this functional association without thereby going beyond the ambit of the invention. Under such circumstances, it is the remote command means, referenced 12 in the FIG. s, that is housed by the case chosen for its appearance, for its auxiliary function, and/or as a communication medium.

Figure 14:
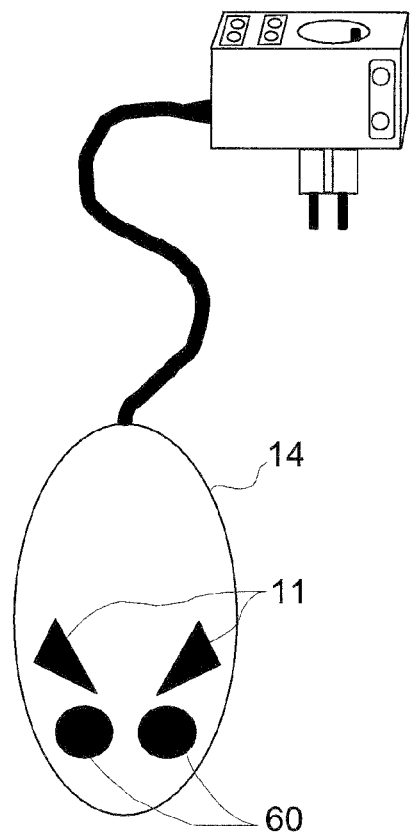

The embodiment of FIG. 14 corresponds to the device of the invention associated with an appearance function that changes, e.g. in order to make it fun to play with. The technical means such as the on command 11 or any display lights and/or sensors 60 are advantageously integrated in characteristic elements of the shape, such as, for example, the ears, or the eyes when the case represents an animal.

Figure 15:
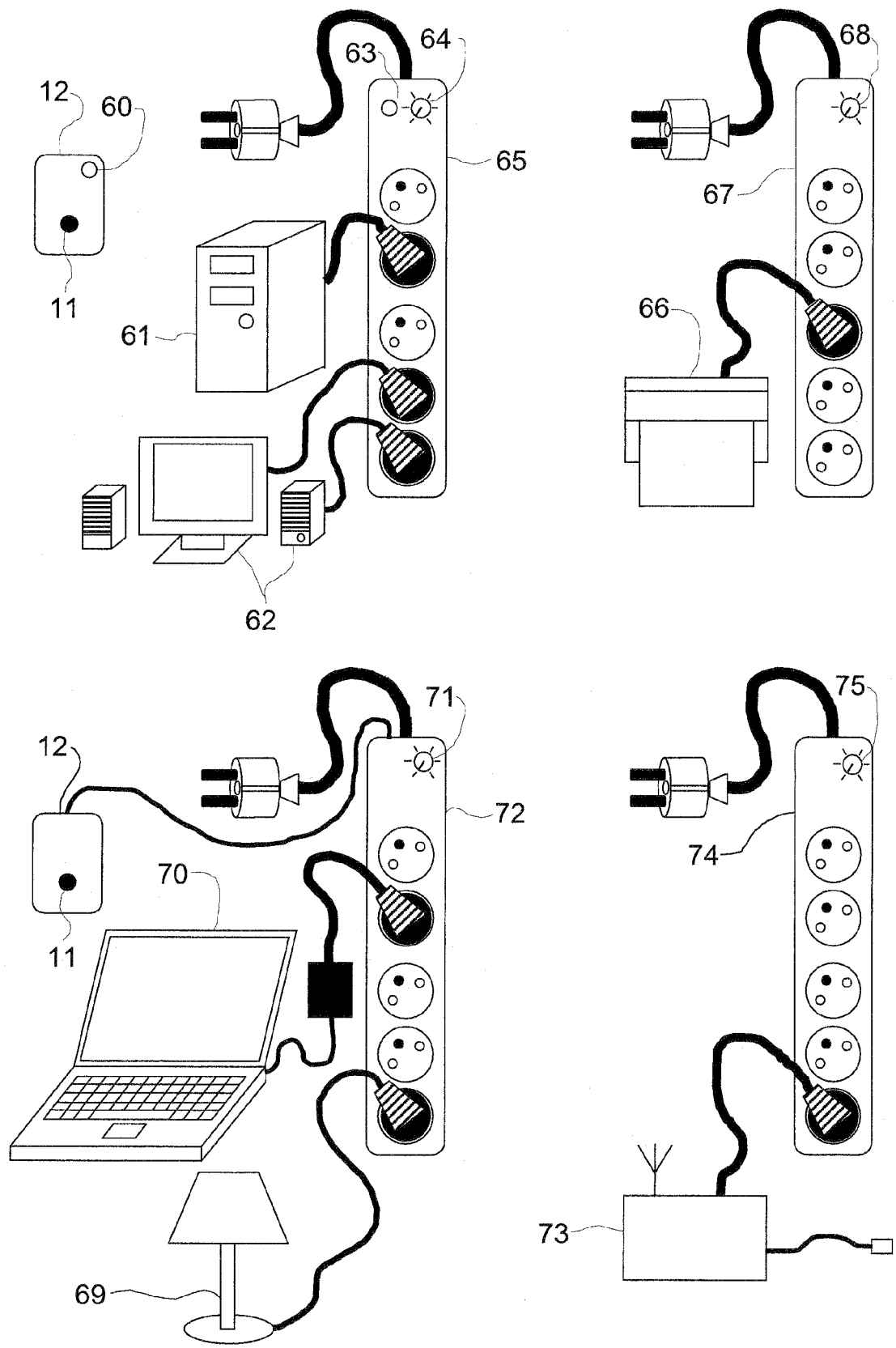
FIG. 15 shows the device of the invention in an embodiment that includes elements for controlling associated remote auxiliary extensions.

The embodiment of FIG. 15 corresponds to the device of the invention in an embodiment that includes means for controlling associated remote auxiliary extensions. The figure shows two devices of the invention with two extensions that are used in a single network for sharing computer resources. The network comprises a first computer 61 connected to the device 65, a second computer 70 connected to the device 72, a remote printer 66 connected to the extension 67, and a remote modem-router 73 connected to the extension 74. The computer appliances are capable of operating together by networking means external to the invention, e.g. by WiFi, by a wired local area network, by power line communication etc.

Each device 65, 72 and each extension 67, 74 of the invention include means for enabling a network code to be assigned thereto. Each device 65, 72 includes communications means, operating at least in transmission, e.g. a radio transmitter in the ISM band, enabling it to transmit control messages to one or more associated extensions 67, 74. Each extension includes communications means, operating at least in reception, arranged to receive control messages transmitted by the devices of the invention, and to take account only of messages that relate to the same network code.

In addition, the devices may advantageously include radio receiver and decoder means suitable for receiving on commands coming from wireless remote command means 12 as shown for the device 65. The wireless remote command means include a button 11, a radio transmitter, and appropriate encoding means. The association uniting each remote command means with the device of the invention that is allocated thereto can advantageously be set up by pushbuttons 60, 63 using a button-pressing procedure in a given time interval both on the remote control and on the device of the invention to be associated therewith so that the device records the unique code of the associated transmitter. Any other means for allocating an identical code for the transmitter and the associated receiver can be suitable, such as, for example: code wheels, or multiple switches. The optional remote control device 12 may also be connected to the device by a cable as shown for the device 72.

Said extensions which, a priori, do not include measurement means, are arranged to supply the connected appliances so long as at least a main device possessing the same network code is in the supplied state, and to stop supplying the connected appliances when all of the main devices having the same network code are off. A simple way of obtaining the expected operation is to arrange the devices of the invention so that they send repeatedly and without interruption a control message that is encoded as a function of the selected network code, but only when said devices are in a state in which said local functional group is supplied. The extensions receiving control messages corresponding to the same network code as their own, deliver power to the controlled appliances connected thereto and reset an internal timeout timer. If no message is received corresponding to the same network code within a substantially determined time period, then the internal timeout period has expired and causes the controlled appliances connected thereto to be switched off. The duration of the timeout period is selected so as to have practically zero probability of not receiving at least one valid control message from at least one device in the supplied state on the same network. In practice, a timeout period of about 10 min can be suitable. The probability of proper operation can be considerably improved by reducing the risk of collisions between messages by repeating message transmissions at instants that are substantially random or at a frequency capable of varying over time or from one item to another, e.g. by incorporating a variable element in the frequency generator, such as a thermistor, or by making the frequency depend on a voltage that is not accurately regulated.

In addition to their ability to control remote extensions 67, 74, the devices 65, 72 provide locally the basic functions of the invention. Thus, when the user switches on the central unit 61 by pressing the button 11 and then starting the computer using the devices provided for that purpose, the appliances 62 forming the local functional group are supplied. The supply of these appliances 62 being stopped, like for the central unit, when the central unit is put in standby state or switched off. The same applies to the appliances connected to the device 74 of the invention.

Naturally, the invention is not limited to the examples described above and numerous alterations can be applied to those examples without going beyond the ambit of the invention, in particular concerning the numbers, the types, and the positions of the connectors, the way in which controls are enabled to be remote, and/or the way in which they set up links of association, and transmit and/or encode information within a network of devices of the invention.

The invention claimed is:

1. A device for saving energy by eliminating electricity consumption on standby for a functional group of controlled appliances comprising at least one main appliance, the device comprising:
- a connection to the electricity network;
- a power supply;
- at least one connection for supplying power to said functional group of controlled appliances including said main appliance;
- a relay for switching on and for switching off the power supplied by the device to said functional group of controlled appliances;
- measurement function part implementing a measurement function in hardware and/or in software for providing an information representative of the power consumed by said functional group of controlled appliances;
- an integration and/or averaging function part implementing an integration and/or averaging function in hardware and/or in software, comprised in said measurement function, for making the information representative of the power consumed by said functional group of controlled appliances insensitive to the waveform of the current flowing in the controlled load involved in the measurement;
- a comparison function part implementing a comparison function in hardware and/or in software, for comparing said information representative of the power consumed by said functional group of controlled appliances with a predetermined threshold;
- means receptive to a command from the user, at least one of these means being dedicated exclusively to the device; and
- a control part implementing a control function, wherein a command from the user causes a supply of power to said functional group of controlled appliances for a first predetermined time, the supply of power being maintained so long as the information representative of the power consumed by said functional group of controlled appliances is greater than a predetermined threshold, and wherein the supply of power to said functional group of controlled appliances, including said main appliance, being automatically stopped by the control part when the information representative of the power consumed by said functional group of controlled appliances is less than the predetermined threshold for a second predetermined time.

2. The device for saving energy according to claim 1, wherein said measurement function provides an information representative of the power consumed by said main appliance only.

3. The device for saving energy according to claim 1, wherein the power supply includes at least one capacitor as a series component for dropping the voltage of the electricity network.

4. The device for saving energy according to claim 1, wherein the power circuit, through which the current drawn by the load flows, comprises passive components only.

5. The device for saving energy according to claim 1, wherein said predetermined threshold is settable by a manual discrete setting having at least two positions.

6. The device for saving energy according to claim 1, wherein said predetermined threshold is settable by executing a learning stage before the device is ready to be used.

7. The device for saving energy according to claim 1, wherein the duration of said second predetermined time is settable.

8. The device for saving energy according to claim 1, wherein the supply of power to said functional group of controlled appliances is automatically stopped when the power consumption is greater than a threshold that is predetermined as a function of at least one characteristic of the device.

9. The device for saving energy according to claim 1, wherein any supplying back of power to said functional group of controlled appliances is inhibited for a period of time after an automatic stop of the supply of power to said functional group of controlled appliances occurs.

10. The device for saving energy according to claim 1, wherein said means receptive to a command from the user comprises a remote control signal receiver suitable for making use of signals emitted by the remote controls for standard audiovisual equipment without decoding said signals.

11. The device for saving energy according to claim 10, wherein an effect of a reception of any remote control signal can be inhibited.

12. The device for saving energy according to claim 10, wherein an effect of a reception of a given remote control signal can be selectively filtered.

13. The device for saving energy according to claim 10, wherein a filtering of unwanted incoming infrared signals is achieved through a sequence of known remote actions within a known time frame.

14. The device for saving energy according to claim 13, wherein at least one visual indication helps the user in executing said sequence in an interactive way.

15. The device for saving energy according to claim 1, wherein the control part is further configured to cause the stop of the supply of power to said functional group of controlled appliances by a manual command.

16. The device for saving energy according to claim 15, wherein the means receptive to the manual command are designed for reducing the risk of an unwanted command.

17. The device for saving energy according to claim 1, further comprising:
- a real time clock including a power supply device for supplying power to the real time clock, the control part further configured to include a programming capability of time periods during which supplying power to said functional group of controlled appliances is enabled according to a user command and forbidden time periods during which supplying power to said functional group of controlled appliances is disabled;
- at least one physical lock configured to secure a power supply connector of the main appliance and prevent a connection of the main appliance to an alternate power supply source during said forbidden time periods; and
- at least one physical and/or logical lock for preventing any supply of power to said functional group of controlled appliances during said forbidden time periods.

18. The device for saving energy according to claim 1, wherein the control part is configured to control one or more associated extensions within a network via transmission means.

19. The device for saving energy according to claim 18, wherein the one or more associated extensions are arranged for supplying power to the appliances that are connected thereto so long as at least one device within the same network is itself in a state in which said functional group that is directly connected thereto is supplied, and for stopping power supply to the appliances that are connected thereto when all of the devices within the same network are in the state in which the supplying of power to the functional groups that are directly connected thereto is stopped.

20. The device for saving energy according to claim 1,
wherein the control part is configured to provide an information representative of the energy consumption of at least one connected appliance, and
wherein the control part further comprises a display for presenting said information to the user in at least one of physical measurement units, monetary units, or as a graphic representation.

21. The device for saving energy according to claim 1,
wherein the control part is configured to provide an information representative of the energy consumption of at least one connected appliance, and
wherein the control part further comprises a display for presenting said information to the user in at least one of physical measurement units, monetary units, or as a graphic representation.

22. The device for saving energy according to claim 1, wherein at least one connection for supplying said functional group of controlled appliances consists in a plurality of connectors that are dedicated to specific functions and that are identified as such.

23. The device for saving energy according to claim 22, wherein at least one connector is permanently supplied with power and is identified as such.

24. The device for saving energy according to claim 22, wherein the plurality of connectors comprises a mix of connectors, said mix of connectors including connectors with a ground connection and connectors having no ground connection.

25. The device for saving energy according to claim 1, further comprising:
a technical casing for enclosing the device; and
an appearance outer casing enclosing the technical casing.

26. The device for saving energy according to claim 1, wherein additional hardware and/or software provides at least one auxiliary function.

\* \* \* \* \*